(12) United States Patent
Nemazie et al.

(10) Patent No.: US 8,677,097 B1
(45) Date of Patent: Mar. 18, 2014

(54) PERSISTENT BLOCK STORAGE ATTACHED TO MEMORY BUS

(71) Applicant: Avalanche Technology, Inc., Fremont, CA (US)

(72) Inventors: Siamack Nemazie, Los Altos Hills, CA (US); Ngon Van Le, Fremont, CA (US)

(73) Assignee: Avalance Technology, Inc., Fremont, CA (US)

( * ) Notice: Subject to any disclaimer, the term of this patent is extended or adjusted under 35 U.S.C. 154(b) by 0 days.

(21) Appl. No.: 13/654,361

(22) Filed: Oct. 17, 2012

(51) Int. Cl.
*G06F 12/00* (2006.01)
(52) U.S. Cl.
USPC ............ 711/170; 711/103; 711/205; 711/206
(58) Field of Classification Search
USPC .................................................. 711/103, 170
See application file for complete search history.

(56) References Cited

U.S. PATENT DOCUMENTS

| 5,778,418 A * | 7/1998 | Auclair et al. ................. 711/101 |
| 2004/0133734 A1 * | 7/2004 | Jordan et al. ................... 711/103 |
| 2010/0082962 A1 * | 4/2010 | Srinivasan et al. ................ 713/2 |
| 2011/0161726 A1 * | 6/2011 | Swanson et al. ............. 714/6.12 |

* cited by examiner

*Primary Examiner* — Reginald Bragdon
*Assistant Examiner* — Mehdi Namazi
(74) *Attorney, Agent, or Firm* — Maryam Imam; IPxLAW Group LLP

(57) ABSTRACT

A method of configuring a computer memory system includes receiving a request from customized software driver or a BIOS extension software or a customized legacy BIOS or a customized UEFI PMM extension software or a customized UEFI BIOS, scanning memory module sockets in response to the request, recognizing memory modules in the memory module sockets, the memory modules being made of, at least in part, persistent memory modules (PMMs), configuring the PMMs to be invisible to the OS, and storing the mapping information to a designated protected persistent memory area, and presenting the PMMs as a persistent block storage to the OS.

11 Claims, 9 Drawing Sheets

PERSISTENT BLOCK STORAGE ATTACHED TO MEMORY BUS

FIELD OF THE INVENTION

The invention relates to computer memory systems and particularly to computer memory systems using persistent memory that includes magnetic random access memory (MRAM).

BACKGROUND OF THE INVENTION

Persistent memory, as is well known in the industry, maintains stored information even with power applied and when power is disconnected from it whereas non-persistent memory does not retain stored information upon memory being disconnected. Dynamic random access memory (DRAM), as it is commonly known is an example of volatile or non-persistent memory. Example of persistent memory are electronic erasable programmable read only memory (EEPROM), NOR Flash, NAND Flash, and magnetic random access memory (MRAM).

Computer systems, such as laptops and desktops, among a slew of other types of devices commonly utilize non-persistent memory (NPM) in installable module configurations coupled to the central processing unit (CPU) via one or more memory buses. The non-persistent memory modules (NPMMs) are categorized in many different form factors, and each form factor has different memory densities, physical sizes and electrical connections. Common form factors of the NPMMs, included but not limited to, are: dual inline memory module (DIMM), single inline memory module SIMM, small outline dual in memory module (SODIMM), Rambus inline memory module (RIMM). A NPMM may contain a serial presence detect (SPD) device. An SPD system is comprised of two main components: a persistent memory device such as an EEPROM that is located on the memory module and an I2C bus controller, located within the memory system. The I2C controller communicates with the SPD memory device over the I2C bus. The EEPROM, 256 bytes in size, has the SDP tables that contains memory module configuration information (such as vendor ID, part number, serial number and other information about the memory devices installed on the module) stored in the first half of 128 bytes. Currently, the second half of 128 bytes is reserved for customer use.

Among many usage models of the NPMMs that attached to memory bus, included but not limited to, are: (1) the OS and/or application programs use the NPMMs for write-back caching. In this usage model, the OS first stores and manages data in the NPMMs and then transfers the data to the main storage devices (hard disk drive (HDD), solid state drive (SSD), etc. . . . ) to gain performance. (2) The OS uses the NPMMs for block data storage. A portion of the NPMMs (less than the total capacity of the memory modules) can be used as RAM block storage or also known as RAM drive or virtual drive, using customized software driver. In this usage model, during system power on, a pre-installed customized software driver allocates a range of memory address in the NPMMs and configures it to work like a local block storage drive. RAMdisk can be initialized as a raw storage drive (without File System) or a formatted storage drive (with File System). In either usage model, information stored in the NPMMs gets lost when the computer system shuts down or reboots. The NPMMs require constant power to maintain information stored in it.

In usage model#1, to guard against the loss of data in the NPMMs in case of unplanned power shutdowns, system vendors, among many things, can: (1) add a battery backup power pack to the non-persistent memory modules. The battery backup power pack provides a short time back up power after power loss; (2) develop a non-volatile memory module in one of the form factors indicated above which comprises non-persistent memory array, persistent memory array, an intelligent controller, and a very large valued capacitor (supercap) or banks of individual capacitors in parallel connection. In either of these designs, when the computer system experiences an unplanned power shutdown, the controller that resides on the non-volatile module starts to transfer cached data from the non-persistent memory array to the persistent memory array to preserve the cached data, using energy from the supercap or the battery pack to power the memory electronics during the transfer operation. When the power is restored, the cached data is transferred back to the non-persistent memory array from the persistent memory array. This data transfer process is transparent to the OS.

Historically, in a computer sub-system, the basic input output system (BIOS) also known as system BIOS or read only memory (ROM) BIOS contains software to identify, enumerate, initialize and configure hardware devices such as CPUs, memory controller, non-persistent memory modules, video cards, mass storage devices, and other peripheral devices (keyboard, mouse etc. . . . ) during and after the power-on process. The BIOS software is stored in a non-persistent device which is mounted on a printed circuit board (motherboard) or on a peripheral component interconnect express (PCIe) add-on card. Historically, the BIOS software has been platform specific. In recent years, improved platform independent BIOS software known as Unified Extensible Firmware Interface (UEFI) BIOS has been introduced. UEFI BIOS enables the computer system to configure and boot to Operating System (OS) faster. In addition, it provides multiple means of extending the BIOS with additional custom software modules and subroutines. In regard to the persistent memory module (PMM), the extensible nature of the UEFI provides an environment for running PMM specific software extensions that allow the configuration, management and support of PMM before the operating system loads. The customized UEFI PMM extension software is not limited to PMM hardware only; it can also configure and adjust previously initialized system components to support the operation of the PMM. Among many different implementations, the customized UEFI PMM extension software can be launched from script or command line. The script or software that contains the command line may reside in a removable storage device or in a fixed storage device or in other types of storage devices.

Obviously, the use of non-persistent memory modules as a block storage that is attached to the computer sub-system's memory bus is limited in use due to the inability of the memory to retain information during a power interruption or when the system is powered off Adding a battery power pack, supercap and/or non-volatile memory components and/or controller contribute to extra cost, lower reliability, higher component count, significantly more power consumption, and higher design complexity.

What is needed is a computer sub-system using other than persistent memory as its memory modules attached to the memory bus that are used to store information in a block storage manner by the computer sub-system without constant power required to retain data. The computer sub-system can configure and manage the PMM as block storage using the following five options:

Option 1—Legacy BIOS
Option 2—Extended legacy BIOS

Option 3—Customized legacy BIOS
Option 4—Extended UEFI BIOS
Option 5—Customized UEFI BIOS
Some of the terms used herein are defined as follows:

Legacy BIOS: a legacy (with no UEFI support) BIOS. Example: BIOS that comes with a computer system that is sold by manufacturer.

Extended legacy BIOS: a legacy (with no UEFI support) BIOS that couples with a BIOS extension software which resides in a non-persistent memory device. This device is mounted on a PCIe add-on card. The PCIe add-on card is attached to the computer sub-system's PCIe bus.

Customized legacy BIOS: a replacement BIOS of a legacy BIOS that couples with legacy BIOS functions and the BIOS extension software in a single non-persistent memory device. The customized legacy BIOS software can be subroutine or library routine.

Extended UEFI BIOS: an UEFI BIOS that couples with customized UEFI PMM extension software. The customized UEFI PMM extension software may reside in a removable storage device such as a USB flash drive or in a specific location on a fixed storage device.

Customized UEFI BIOS: a replacement BIOS of a UEFI BIOS that couples with UEFI BIOS functions and a customized UEFI PMM extension software. The customized UEFI PMM extension software can be software applications, software driver or subroutine or library routine.

SUMMARY OF THE INVENTION

Briefly, a method of configuring persistent memory modules in a computer sub-system that includes both persistent memory modules and non-persistent memory modules includes receiving a request from a customized software driver or a BIOS extension software or a customized legacy BIOS or a customized UEFI PMM extension software or a customized UEFI BIOS; scanning memory module sockets in response to the request; recognizing the non-persistent memory modules in addition to the persistent memory modules in the memory module sockets; programming a table within the PMM and configuring the PMMs to be invisible (undetected) to the OS during operation mapping the persistent memory modules to an unallocated area of the memory address space; storing the mapping information to a designated protected persistent memory area; the memory modules being made of, at least in part, persistent memory modules (PMMs).

These and other objects and advantages of the invention will no doubt become apparent to those skilled in the art after having read the following detailed description of the various embodiments illustrated in the several figures of the drawing.

IN THE DRAWINGS

DETAILED DESCRIPTION OF VARIOUS EMBODIMENTS

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention. It should be noted that the figures discussed herein are not drawn to scale and thicknesses of lines are not indicative of actual sizes.

Figure 1:
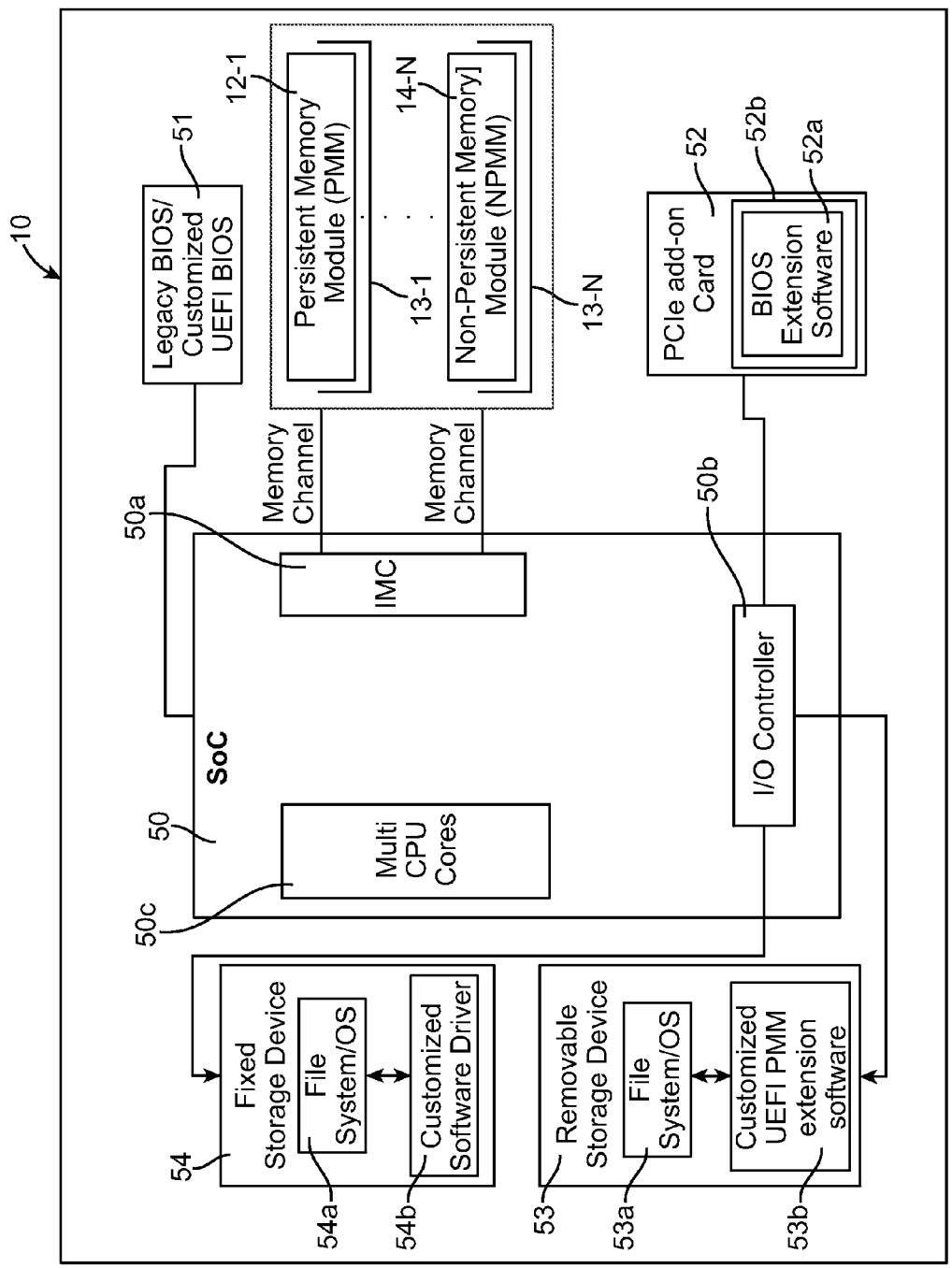
FIG. 1 shows a computer sub-system 10, in accordance with an embodiment of the invention.

Referring to FIG. 1, a computer sub-system 10 is shown to include a system-on-chip (SoC) 50, an integrated circuit (IC) that integrates components such as one or more central processing units (CPUs) cores 50*c*, memory components such as read only memory (ROM) (not show), static random access memory (SRAM) (not show), graphic processing unit (GPU) (not show), integrated memory controller (IMC) 50*a*, and input/output (I/O) controller 50*b* which manages communications with external mass storage devices such as a serial advanced technology attachment (SATA) device 54 and/or a removable storage device 53.

It is generally known that in a computer system, such as the computer sub-system 10, the multi CPU cores 50*c* serve as the brain of the system and communicates with the IMC 50*a* accordingly. The IMC 50*a* serves as the intermediary between the multi CPU cores 50*c* and the modules 12-1 and 14-N. The computer sub-system 10 further comprises two memory module sockets, 13-1 and 13-N respectively. The memory modules such as 12-1 and 14-N are installed on a computer's motherboard by placing them into the memory module sockets 13-1 and 13-N. The memory module sockets are well known in the art.

The IMC 50*a* serves to direct information to and from the modules 12-1 and 14-N, and is also well known in the art. The computer sub-system 10 communicates with the module 12-1 through the memory channel 1 and the computer sub-system 10 communicates with the module 14-N through the memory channel N with "N" representing an integer value. In this respect, an "N" number of modules, such as non-persistent memory module 12-1 and persistent memory module 14-N may be employed by the computer sub-system 10, and therefore an "N" number of memory channels may also be employed. An "N" number also represents number of memory module sockets.

The BIOS 51 is coupled to the computer sub-system 10 via the serial peripheral interface (SPI) bus (not show). As defined above, the BIOS 51 can either be a legacy BIOS or a customized legacy BIOS or a customized UEFI BIOS. The PCIe add-on card 52 includes a persistent memory device 52b which contains BIOS extension software 52a. The PCIe add-on card may couple to the computer sub-system 10. The BIOS extension software 52a contains additional BIOS software program used to configure the PMM 12-1.

A customized software driver 54b is an executable software program that interacts with hardware devices such the IMC 50a or the multiple CPU cores 50c via a fixed storage device 54. The fixed storage device 54 may connect to an I/O controller 50b. The customized software driver 54b is hardware-dependent and operating system specific. In the Microsoft Windows platforms, for example, the customized software driver 54b executes CPU machine instructions in an operating system specific environment known as either user mode or kernel mode. In both modes, the operating system allows the customized software driver 54b to access hardware devices such as the IMC 50a and to interact with the operating system 54a (OS). The customize software driver 54b may be stored in a system specific file system folder or directory. Although it is shown that customize software driver 54b resides in fixed storage device 54, it can be in other persistent memory area.

In summary, to configure the computer sub-system 10, the IMC 50a receives a request from a customized software driver or a BIOS extension software or a customized legacy BIOS or a customized UEFI PMM extension software or a customized UEFI BIOS that is configured to operate with the OS 54a. Further to configure the computer sub-system 10, the memory module sockets 13-1 through 13-N are scanned by the customized software driver 54b or the BIOS extension software 52a or the customized legacy BIOS 51 or the customized UEFI PMM extension software 53b or the customized UEFI BIOS 51 in response to the request. Additionally, the memory module 12-1 through 14-N are recognized, to the extend they are present, in the memory module sockets 13-1 through 13-N by the customized software driver 54b or the BIOS extension software 52a or the customized legacy BIOS 51 or the customized UEFI PMM extension software 53b or the customized UEFI BIOS 51.

Figure 4:
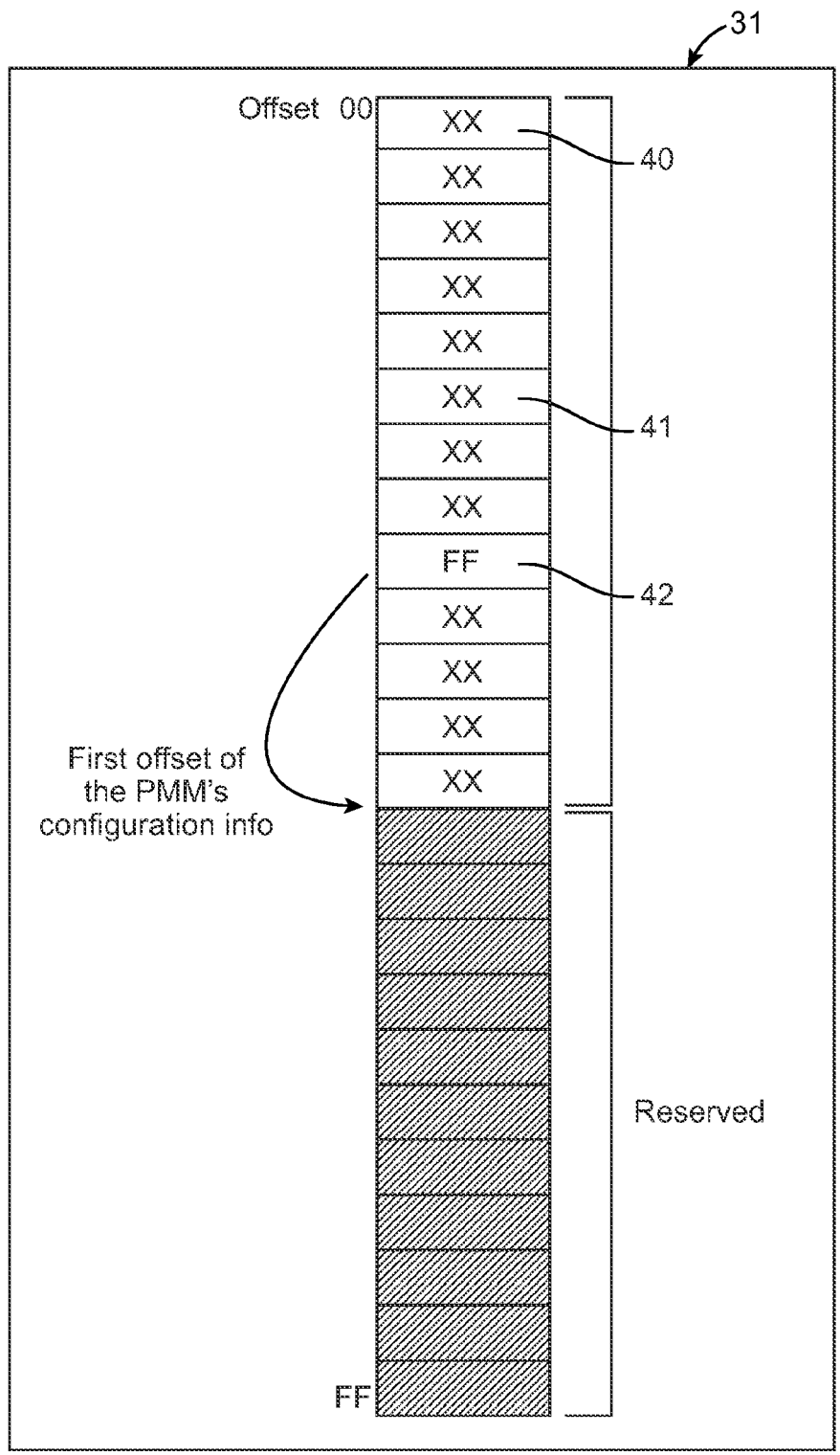
FIG. 4 shows a SPD table 31, in accordance with yet another embodiment of the invention.

A table (an example of which is shown in FIG. 4 as the SPD table 31) is programmed by the customized driver 54b within the PMM 12-1 to allow the PMM to remain invisible to the OS 54a.

Figure 2:
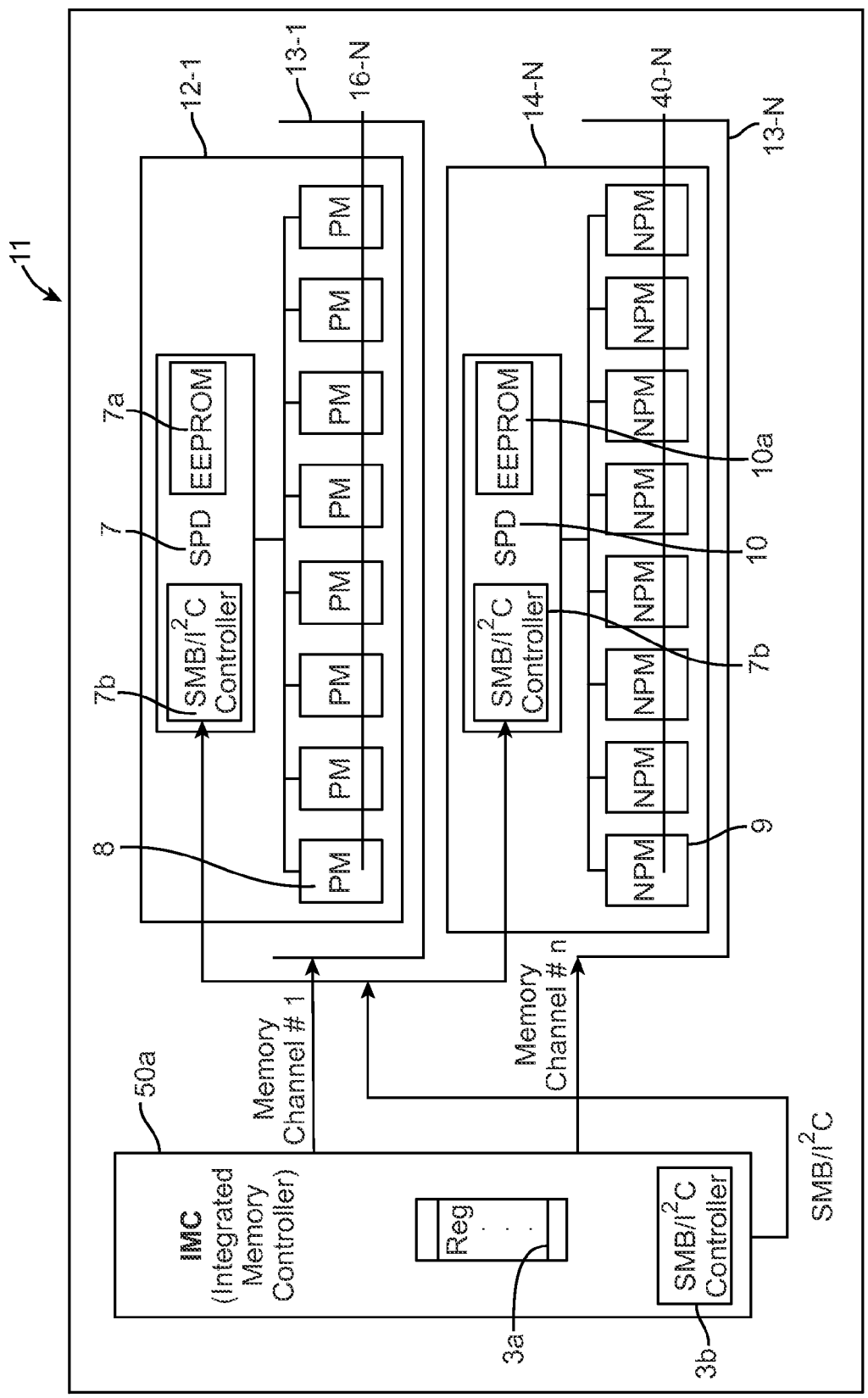
FIG. 2 shows a memory system 11, in accordance with another embodiment of the invention.

Referring now to FIG. 2, a memory system 11 is shown to include an integrated memory controller (IMC) 50a, a persistent memory module (PMM) 12-1, and a non-persistent memory module (NPMM) 14-N, in accordance with an embodiment invention. The IMC 50a is shown to include register sets 3a and a system management bus/inter-integrated circuit (SMB)/I²C controller 3b. While one PMM is shown in FIG. 2, it is understood that any number of PMMs may be employed, and the number of PMMs is generally dictated by either the memory requirements of a particular application or of the number of memory channels supported by the IMC 50a.

Each of the PMM 12-1 and the NPMM 14-N is shown to include an array of persistent memory (PM) blocks 16-N and non-persistent memory (NPM) blocks 40-N, respectively. In FIG. 2 NPMM 14-N can be of various types, such as but not limited to DRAM. The NPMM 14-N is also commonly referred to as a DRAM memory module and each of its NPMs may be a DDR1, DDR2, DDR3 or DDR4 type of memory device, well known in the art. The memory devices such as NPMs 9 are typically populated on either one side or both sides of the module. The same holds true for any of the PM blocks, such as the block 16-N.

PMM installation requirements are as follows:
PMMs can be installed in pairs
Both PMMs can use the same density and same configuration non persistent memory such as MRAM
Both PMMs use the same memory bus width
Both PMMs can be either single sided or dual sided The IMC 50a includes a set of registers 3a, readily known in the art, for storing certain information such as timing parameters, configuration parameters, memory address locations of the NPMM and the PMM.

Each of the PMM 12-1 and the NPMM 14-N is shown to include an array of persistent memory (PM) blocks 16-N and non-persistent memory (NPM) blocks 40-N, respectively. As indicated above, either option 1, or 2, or 3, or 4, or 5 can communicate, initialize, and map the PMM to an allocated area of the memory address space supported by the IMC 50a. As is well known, typically, the set of registers 3a holds the mapping of such information.

Each of the PMM 12-1 and NPMM 14-N is shown to include a SPD device 7. For example, the module 12-1 includes the SPD 7, which is shown to include the SMB/I²C controller 7b and the EEPROM 7a. Each of the memory channels 1 through N are used for communication between the IMC 50a and the SPDs of each of the modules 12-1 and 14-N. The communication between the IMC 50a and each of the modules 12-1 and 14-N is mostly done by a respective IMC 50a within the memory system 11. The IMC 50a is used to communicate with the PMM 12-1 and the NPMM 14-N through but not limited to a SMB/I²C bus.

Figure 3:
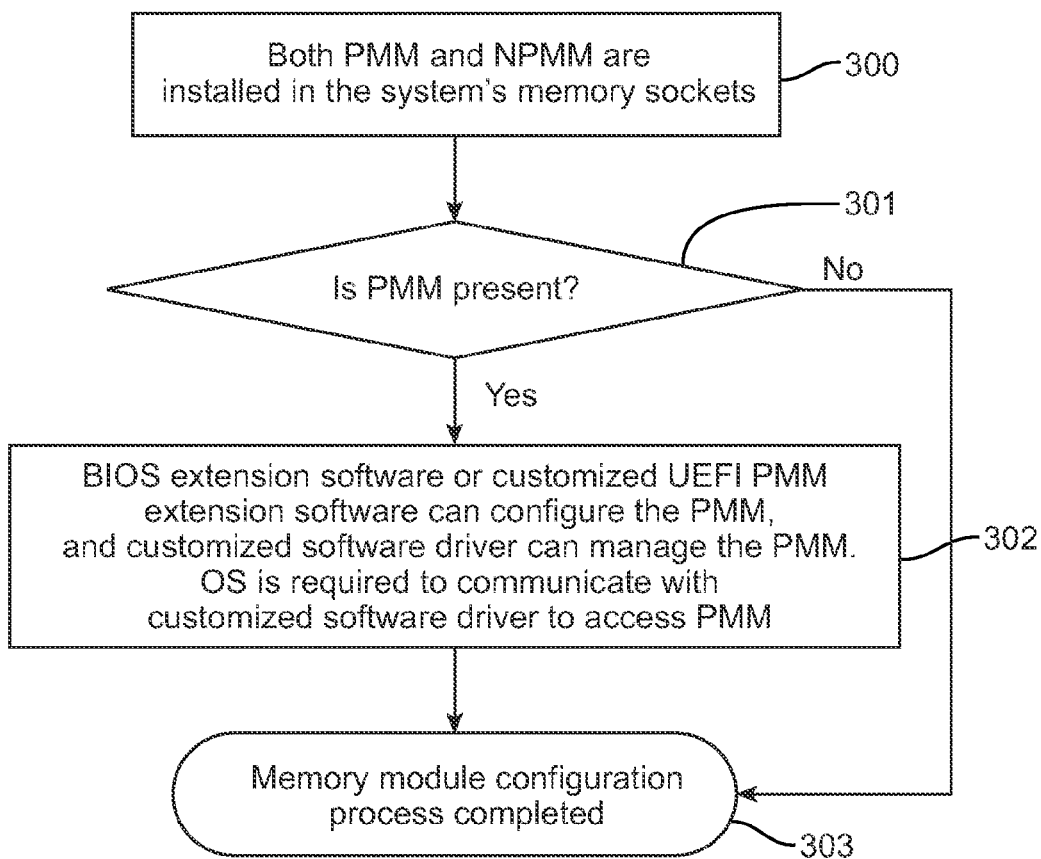
FIG. 3 shows a high level memory module configuration flow chart, in accordance with another embodiment of the invention.

Referring to FIG. 3, a high level memory configuration flow chart is shown to include steps to configure both the NPMM 14-N and PMM 12-1 in a computer sub-system. The steps of FIG. 3 are performed by the BIOS 51 and/or BIOS extension 52a or the customized UEFI PMM extension software 53b or the customized software driver or 54b of FIG. 1.

In FIG. 3, at step 300, the PMM and NPMM, for example PMM 12-1 and NPMM 14-N in FIG. 2, are installed in memory module sockets 13-1 and 13-N respectively of the computer sub-system 10. Next, at 301, the PMM 12-1 is determined to be present or not, and if not, the process proceeds to step 303 where the memory module configuration process is considered completed. If the PMM 12-1 is determined to be present at 301, the process continues to step 302. Only the BIOS extension software 52a or the customized UEFI PMM extension software 53b can configure the PMM 12-1, and customized driver 54b can manage the PMM 12-1. The PMM 12-1 remains invisible to the legacy BIOS and the UEFI BIOS (during boot) and the OS (during operation). That is, while the OS can access the PMM's contents, this can only be done via the customized UEFI PMM extension software 53b or customized driver 54b, as the case may be. In this respect, the PMM 12-1 remains invisible to the OS.

Next, at step 302, the customized driver 54b configures IMC 50a, registers 3a and provides the software layer for OS access to the PMM 12-1. The OS 54a is required to communicate with the customized driver 54b to access the PMM 12-1. Next, the process ends at step 303 in that the PMM 12-1 and NPMM 14-N are fully configured in which the PMM 12-1 is configured as block storage and the NPMM 14-N is configured as system memory. Both the PMM 12-1 and the NPMM 14-N are attached to the memory bus. It is noted that NPMM 14-N is visible to and can be directly accessed by the OS whereas the PMM 12-1 is invisible to and can only be indirectly accessed by the OS via the customized driver 54b.

Referring now to FIG. 4, a SPD table 31 is an exemplary table that includes PMM's and NPMM's configuration information. During manufacturing, the EEPROM device 7a/10a is programmed with specific values to represent the module 12-1/14-N characteristics. For examples, in EEPROM device 7a one or more designated fields, memory module detection indicator 40, contains information to indicate the presence or absence of the PMMs. In the case where absence of the PMMs detected, in accordance with the various embodiment and methods of the inventions, the PMM remains invisible to the OS. One or more designated fields in the table, device type indicator 41, contain information to define the memory type being populated on the module. One or more designated fields, PMM configuration pointer 42, contain information to show the pointer pointing to the first offset of the PMM's configuration information. During the power on initializing process, such as done in option 1, or 2, or 3, or 4, or 5, the customized software driver 54b or the BIOS extension software 52a or the customized legacy BIOS 51 or the customized UEFI PMM extension software 53b or the customized UEFI BIOS 51 reads the SPD data, and configures the PMMs accordingly based on the information stored in the SPD data. It should be noted that the SPD data is programmed into the EEPROM in a manner that is compatible with industry standard.

In some embodiments, information transferred between the memory system 11 and the PM blocks 12-1 and 14-N, through the memory channels 1 through N, is organized into blocks, therefore, block storage is the manner in which information is stored within the persistent memory blocks. Block storage, as opposed to main memory or system memory, the latter of which is well known in the art, requires a software driver and/or file system management, whereas, in the case of main memory (system memory) is used for executing in place (XIP) of code and/or software application without any kind of software driver or file system management required.

In accordance with a method of the invention, the PMM's EEPROM 7a which is part of the SPD 7 is programmed as a persistent memory type at factory and is configured to be invisible to the OS. As indicated in FIG. 4, the SPD table 31 which resides in the EEPROM 7a contains both PMM's and NPMM's configuration information. During the operation of the computer sub-system 10, a sequence of read operations are performed in accordance with one of the five options described above, determining which memory module exists and the type of memory module operated in the computer sub-system 10.

Figure 5:
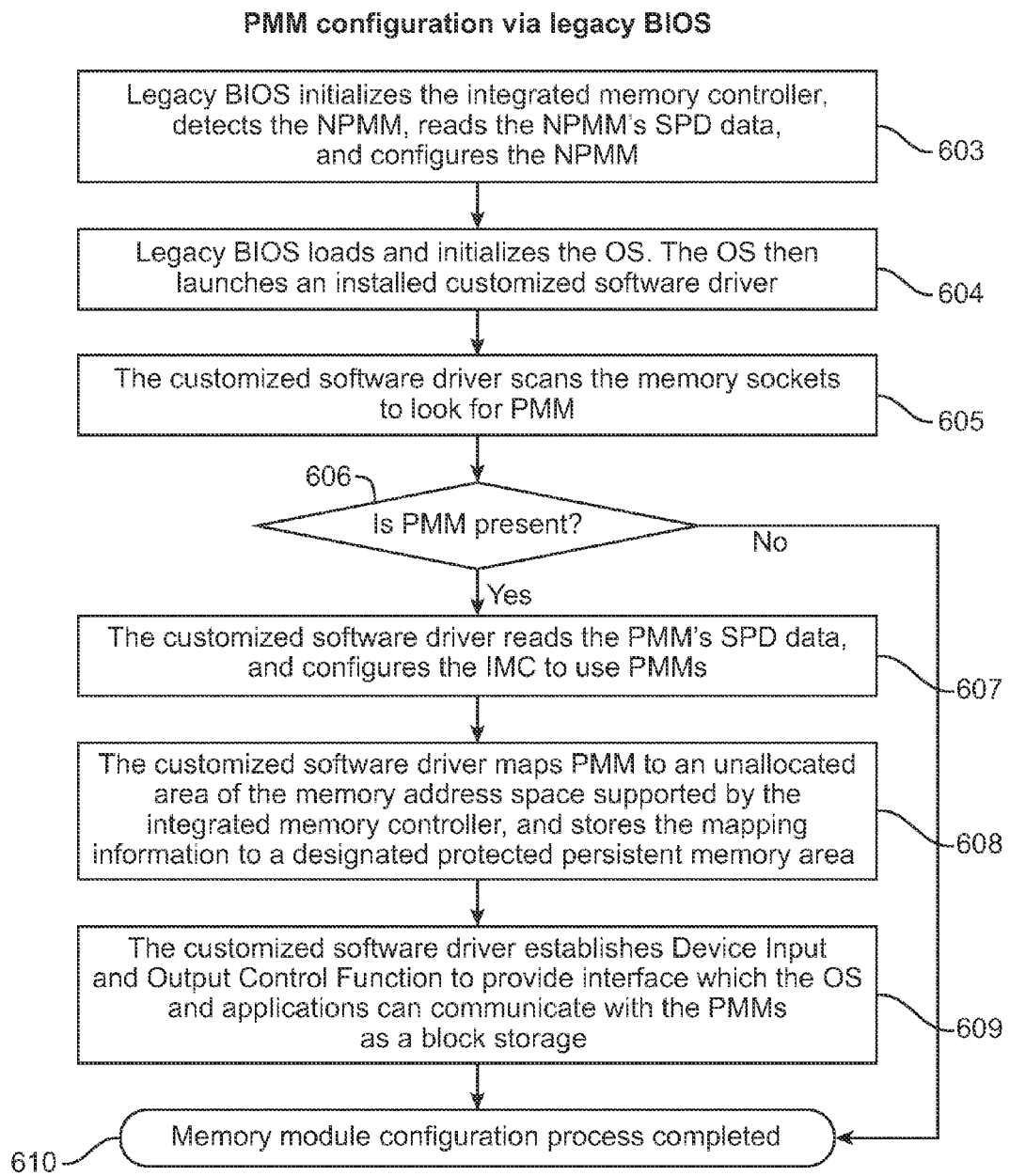
FIG. 5 shows a flow chart of the relevant steps performed in configuring the computer sub-system 10 via legacy BIOS, in accordance with a method of the invention (option 1).

FIG. 5 shows a flow chart of the relevant steps performed in configuring the computer sub-systems 10 via legacy BIOS in accordance with method of the invention (option 1).

In accordance with this method of the invention, the following sequence of steps is performed by the computer sub-system 10:

At step 603, the legacy BIOS initializes the IMC 50a, detects the NPMM, reads the data that is saved in the SPD 7, and configures the NPMM such as the module 14-N during power on. Next, at step 604, the legacy BIOS loads and initializes the OS, and an installed customized software driver such as software driver 54b, in FIG. 1 is launched.

Next, at step 605, the customized software driver 54b scans the memory socket to look for PMM such as PMM 12-1 and at 606, a determination is made as to whether or not the PMM is present or not. If so, the process continues to step 607, otherwise, the process goes to 610 where the memory module configuration process is considered complete.

At step 607, the customized software driver 54b reads the module's SPD data, and configures the IMC 50a to use PMMs such as the PMM 12-1. Next, at step 608, the customized software driver 54b maps the PMM to an unallocated area of the memory address space supported by the IMC 50a, and stores the mapping information to a designated protected persistent memory area. An example of this designated protected persistent memory area is a protected area that resides in BIOS, and accessible by the customized software driver 54b and the OS. Next, at step 609, the customized software driver 54b establishes device input and output control function to provide interface which the operating system and applications can communicate with the PMMs as a block storage, and the process is considered complete at 610.

Figure 6:
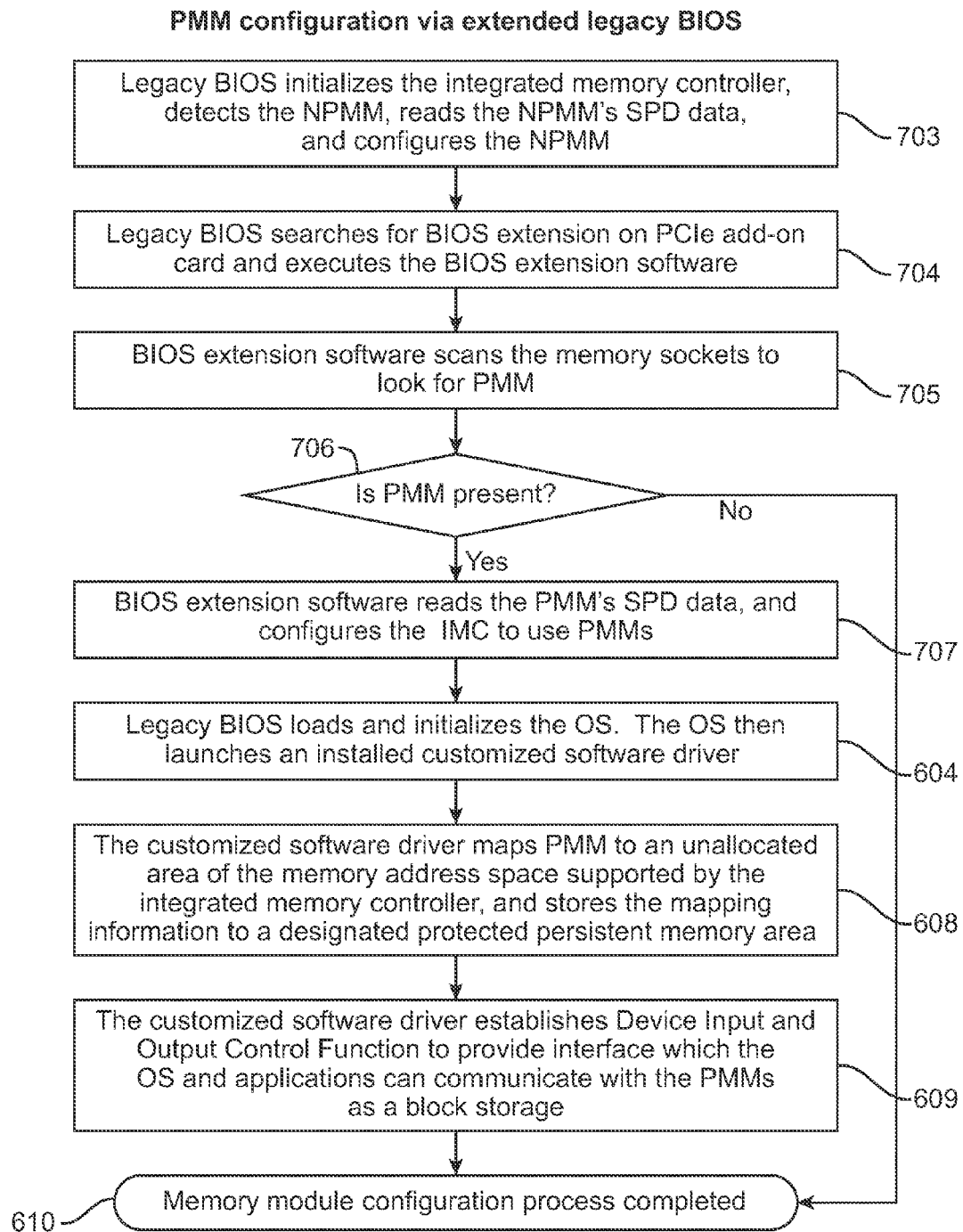
FIG. 6 shows a flow chart of the relevant steps performed in configuring the computer sub-system 10 via extended legacy BIOS, in accordance with a method of the invention (option 2).

FIG. 6 shows a flow chart of the relevant steps performed in configuring the computer sub-systems 10 via extended legacy BIOS in accordance with method of the invention (option 2).

In accordance with this method of the invention, the following sequence of steps is performed by the computer sub-system 10 of FIG. 1. The step 703 is analogous to that of the step 603 of the flow chart of FIG. 5. Next, at step 704, the legacy BIOS searches for BIOS extension software and finds BIOS extension software 52a on a PCIe add-on card 52, and then executes the BIOS extension software 52a. Next, at step 705, the BIOS extension software scans the memory sockets to look for PMM such as PMM 12-1, followed by, at 706, determining whether or not the PMM 12-1 is present. If at 706, it is determined that the PMM is not present, the process continues to 610.

If at 706 it is determined that the PMM is present, the process continues to step 707 where the BIOS extension software 52a reads the PMM's SPD data and configures the IMC 50a to use PMMs such as PMM 12-1. After step 707, the steps 604, 608, and 609 are performed, as discussed above.

Figure 7:
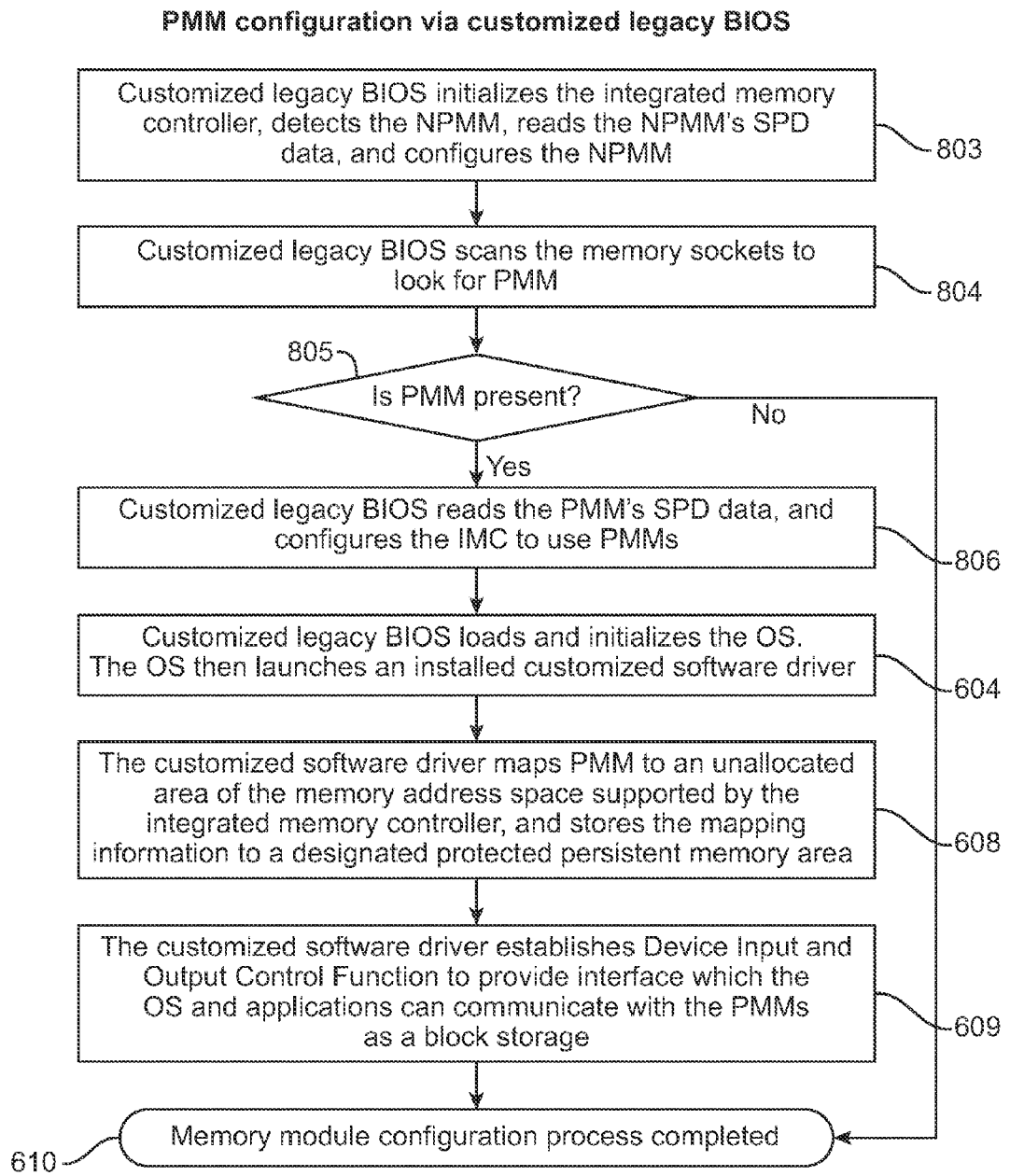
FIG. 7 shows a flow chart of the relevant steps performed in configuring the computer sub-system 10 via customized legacy BIOS, in accordance with a method of the invention (option 3).

FIG. 7 shows a flow chart of the relevant steps performed in configuring the computer sub-systems 10 via customized legacy BIOS in accordance with method of the invention (option 3).

In accordance with this method of the invention, the following sequence of steps is performed by the computer sub-system 10 of FIG. 1. At step 803, the customized legacy BIOS initializes the IMC 50a, detects the NPMM 14-N, reads the NPMM's SPD data, and configures the IMC 50a to use NPMMs such as NPMM 14-N.

Next, at step 804, the customized legacy BIOS scans the memory sockets to look for PMM such as PMM 12-1, followed by, at 805, determining whether or not the PMM such as PMM 12-1 is present. If at 805, it is determined that the PMM is not present, the process continues to 610.

At step 806, the customized legacy BIOS reads the PMM's SPD data and configures the IMC 50a to use PMMs such as PMM 12-1. Next, steps 604 through 610 are performed as shown in FIG. 6 as discussed above.

Figure 8:
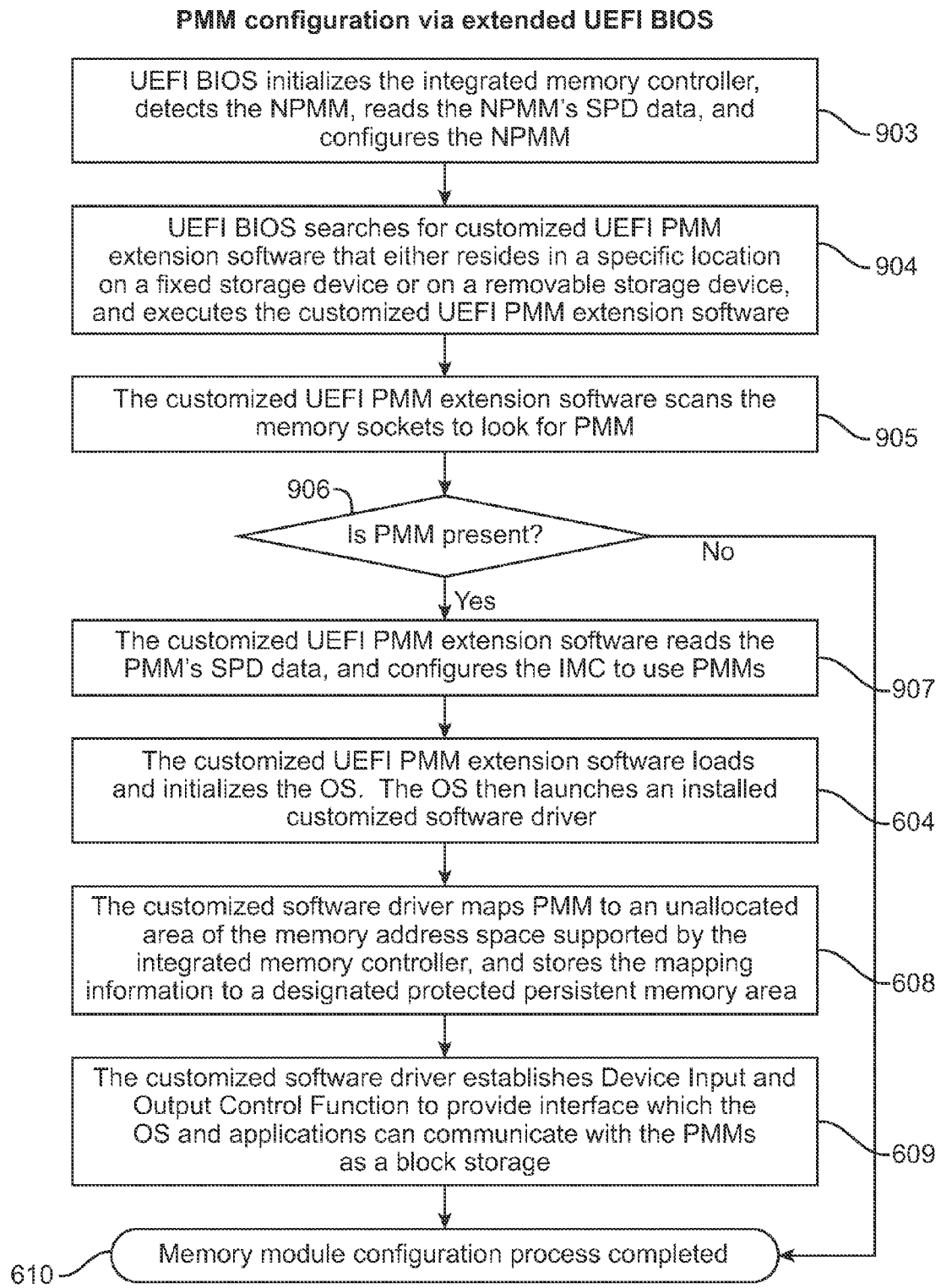
FIG. 8 shows a flow chart of the relevant steps performed in configuring the computer sub-system 10 via extended UEFI BIOS, in accordance with a method of the invention (option 4).

FIG. 8 shows a flow chart of the relevant steps performed in configuring the computer sub-systems 10 via extended UEFI BIOS in accordance with method of the invention (option 4).

In FIG. 8, at step 903, the UEFI BIOS initializes the IMC 50a, detects the NPMM such as NPMM 14-N, reads the NPMM's SPD data, and configures the IMC 50a to use NPMMs such as NPMM 14-N during power on. Next, at step 904, the UEFI BIOS searches for customized UEFI PMM extension software 53b that can either reside in a specific location (not shown) on a fixed storage device 54 in FIG. 1 or on a removable storage device 53, and executes the customized UEFI PMM extension software 53b. Next, at step 905, the customized UEFI PMM extension software scans the memory sockets to look for PMM such as PMM 12-1. Next, at 906, a determination is made as to whether or not the PMM is present and if not, the process continues to 610, otherwise, step 907 is performed. At step 907, the customized UEFI PMM extension software reads the PMM's SPD data, and configures the IMC 50*a* to use the PMMs such as PMM 12-1. Next, steps 604 through 610 are performed, as shown in FIG. 6 as discussed above.

Figure 9:
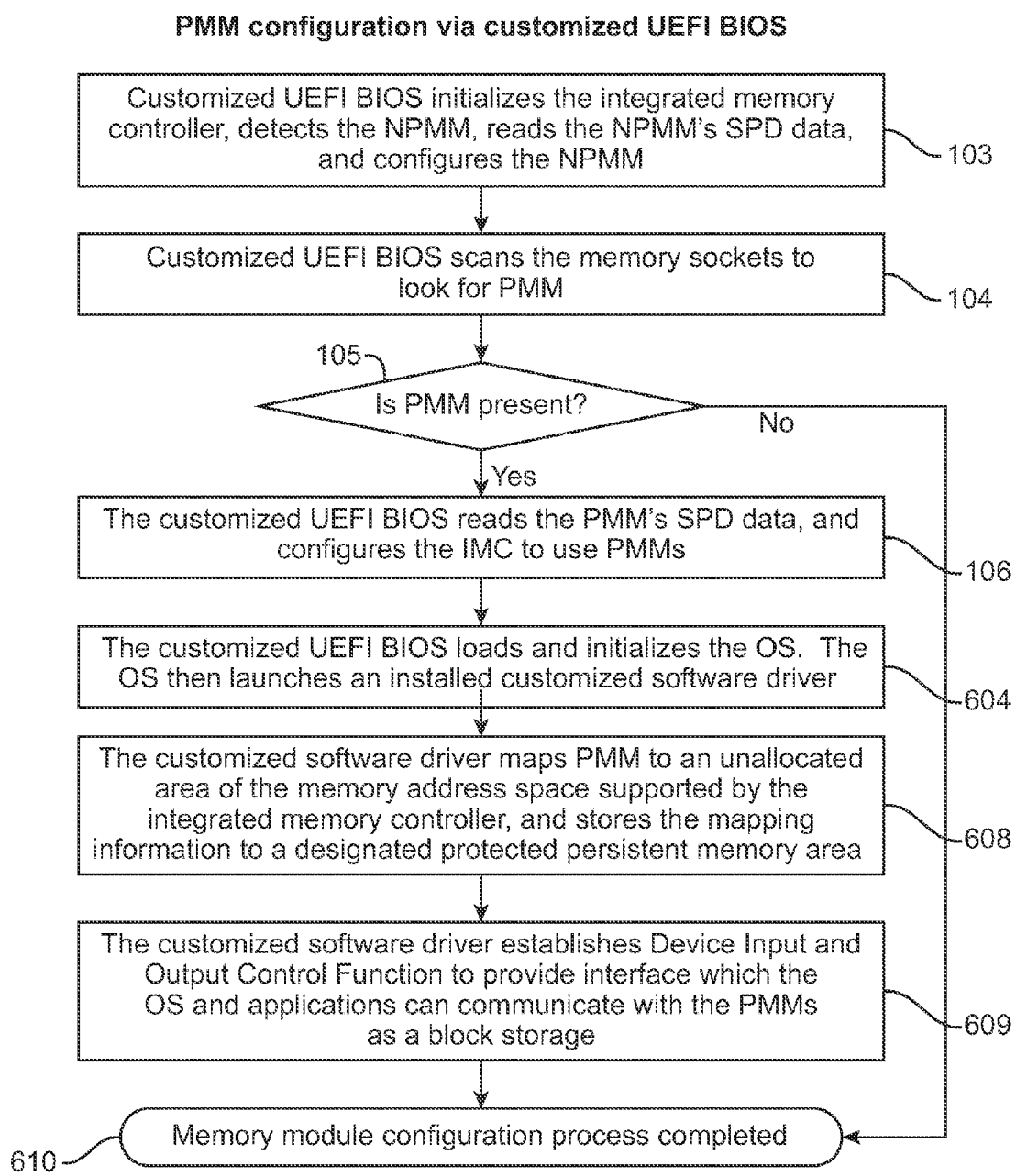
FIG. 9 shows a flow chart of the relevant steps performed in configuring the computer sub-system 10 via customized UEFI BIOS, in accordance with a method of the invention (option 5).

FIG. 9 shows a flow chart of the relevant steps performed in configuring the computer sub-systems 10 via customized UEFI BIOS in accordance with method of the invention (option 5).

In FIG. 9, at step 103, the customized UEFI BIOS initializes the IMC 50*a*, detects the NPMM such as NPMM 14-N, reads the NPMM's SPD data and configures the NPMM during power on. Next, at step 104, the customized UEFI BIOS scans the memory sockets to look for PMM such as PMM 12-1. Next, at 105, a determination is made as to whether or not the PMM is present and if not, the process continues to 610, otherwise, step 106 is performed. At step 106, the customized UEFI BIOS reads the PMM's SPD data and configures the IMC 50*a* to use the PMMs such as PMM 12-1. Next, steps 604 through 610 are performed, as shown in FIG. 6 as discussed above.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of configuring a computer sub-system comprising:
   receiving a request from a legacy BIOS that is configured to operate with an operating system (OS);
   scanning memory module sockets in response to the request; and
   recognizing memory modules in the memory module sockets, the memory modules being made of persistent memory modules (PMMs) and non-persistent memory modules (NPMMs), wherein each memory module is comprised entirely of either PMMs or NPMMs;
   creating and storing PMM memory address mapping information in a designated, protected persistent memory area; and
   programming a table within a PMM of the PMMs to allow the PMM, in its entirety, to remain invisible to the OS, wherein the PMM can only be indirectly accessed by the OS via a customized software driver.

2. The method of claim 1, further including indicating the presence or absence of the PMM using a memory module detection indicator in the table.

3. The method of claim 1, further including identifying a memory type of a memory module of the memory modules using a device type indicator in the table.

4. A method of configuring a computer sub-system comprising:
   receiving a request from an extended legacy BIOS;
   scanning memory module sockets in response to the request;
   recognizing memory modules in the memory module sockets, the memory modules being made of, at least in part, persistent memory modules (PMMs) and non-persistent memory modules (NPMMs), wherein each memory module is comprised entirely of either PMMs or NPMMs;
   creating and storing a mapping information in a designated, protected persistent memory area; and
   programming a table within a PMM of the PMMs to allow the PMM, in its entirety, to remain invisible to the OS, wherein the PMM can only be indirectly accessed by the OS via a customized software driver.

5. The method of configuring of claim 4, further including storing a BIOS extension software in a persistent memory device which resides on a PCIe add-on card and executing the BIOS extension software from the PCIe add-on card.

6. The method of claim 4, further including indicating the presence or absence of the PMM using a memory module detection indicator in the table.

7. A method of configuring a computer sub-system comprising:
   receiving a request from a customized legacy BIOS;
   scanning memory module sockets in response to the request;
   recognizing memory modules in the memory module sockets, the memory modules being made of, at least in part, persistent memory modules (PMMs) and non-persistent memory modules (NPMMs), wherein each memory module is comprised entirely of either PMMs or NPMMs;
   creating and storing the mapping information in a designated, protected persistent memory area; and
   programming a table within a PMM of the PMMs to allow the PMM, in its entirety, to remain invisible to the OS, wherein the PMM can only be indirectly accessed by the OS via a customized software driver.

8. The method of configuring of claim 7, further including creating customized legacy BIOS that couples with legacy BIOS functions and a BIOS extension software in a single non-persistent memory device, and installing it in a computer sub-system.

9. A method of configuring a computer sub-system comprising:
   receiving a request from an extended UEFI BIOS or customized UEFI BIOS;
   scanning memory module sockets in response to the request;
   recognizing memory modules in the memory module sockets, the memory modules being made of, at least in part, persistent memory modules (PMMs) and non-persistent memory modules (NPMMs), wherein each memory module is comprised entirely of either PMMs or NPMMs;
   creating and storing the mapping information in a designated, protected persistent memory area, and
   programming a table within a PMM of the PMMs to allow the PMM, in its entirety, to remain invisible to the OS, wherein the PMM can only be indirectly accessed by the OS via a customized software driver.

10. The method of configuring of claim 9, further including creating customized UEFI BIOS that couples with UEFI BIOS functions and customized UEFI PMM extension software in a single non-persistent memory device, and installing the customized UEFI PMM extension software on the computer sub-system.

11. The method of configuring of claim 10, further including storing the customized UEFI PMM extension software to a removable storage device or a specific location on a fixed storage device, and executing the customized UEFI PMM extension software from the one of these devices.

* * * * *